United States Patent [19]
Manico et al.

[11] Patent Number: 5,623,325
[45] Date of Patent: Apr. 22, 1997

[54] FILM CARTRIDGE WITH VISUAL FILM MOTION INDICATOR FOR VERIFYING FILM LOADING IN CAMERA

[75] Inventors: Joseph A. Manico; Richard S. Keirsbilck; John A. Agostinelli, all of Rochester; Edgar G. Earnhart, Hilton, all of N.Y.

[73] Assignee: Eastman Kodak Company, Rochester, N.Y.

[21] Appl. No.: 629,699

[22] Filed: Apr. 9, 1996

[51] Int. Cl.$^6$ .................................................. G03B 17/26
[52] U.S. Cl. ........................................................ 396/515
[58] Field of Search .................................. 354/275, 217, 354/218

[56] References Cited

U.S. PATENT DOCUMENTS

| | | | |
|---|---|---|---|
| 1,836,699 | 12/1931 | Wood | 354/275 |
| 3,687,037 | 8/1972 | Nerwin | 95/31 |
| 4,335,948 | 6/1982 | Cocco | 354/275 |
| 4,875,638 | 10/1989 | Harvey | 242/71.1 |
| 4,887,110 | 12/1989 | Harvey | 354/275 |
| 4,894,673 | 1/1990 | Beach | 354/275 |
| 5,032,861 | 7/1991 | Pagano | 354/275 |
| 5,255,039 | 10/1993 | Miller | 354/275 |
| 5,264,886 | 11/1993 | Byrd | 354/275 |
| 5,278,600 | 1/1994 | Takahashi et al. | 354/275 |
| 5,285,227 | 2/1994 | Lawther et al. | 354/275 |
| 5,550,609 | 8/1996 | Stephany | 354/275 |

*Primary Examiner*—Safet Metjahic
*Assistant Examiner*—John Chizmar
*Attorney, Agent, or Firm*—Roger A. Fields

[57] ABSTRACT

A film cartridge comprising a filmstrip having longitudinally successive perforations, and a housing for the filmstrip having a film passage slit through which the filmstrip can be moved into or out of the housing, is characterized by a reciprocatingly movable indicator, including an actuator pawl positioned for engagement and disengagement with each perforation of the filmstrip as the filmstrip is moved through the slit to move the indicator forward and backward alternately for providing a visible motion-indication that the filmstrip is moving through the slit.

10 Claims, 2 Drawing Sheets

5,623,325

FILM CARTRIDGE WITH VISUAL FILM MOTION INDICATOR FOR VERIFYING FILM LOADING IN CAMERA

Reference is made to commonly assigned copending applications Ser. No. 08/586,520, entitled FILM CARTRIDGE WITH VISUAL INDICATOR FOR VERIFYING FILM LOADING IN CAMERA and filed Jan. 16, 1996 in the names of Madhay Mehra and Joseph A. Manico, Ser. No. 08/584,853, entitled FILM CARTRIDGE WITH VISUAL INDICATOR FOR VERIFYING FILM LOADING IN CAMERA and filed Jan. 11, 1996 in the names of Madhay Mehra and Joseph A. Manico, Ser. No. 08/584,480, entitled FILM CARTRIDGE WITH VISUAL INDICATOR FOR VERIFYING FILM LOADING IN CAMERA and filed Jan. 11, 1996 in the names of Joseph A. Manico and Dwight J. Petruchik, Ser. No. 08/449,032, entitled FILM SPOOL WITH BUILT-IN AUDIBLE INDICATOR FOR VERIFYING FILM LOADING IN CAMERA and filed May 24, 1995 in the name of Joseph A. Manico.

FIELD OF THE INVENTION

The invention relates generally to the field of photography, and in particular to a film cartridge with a visual indicator for verifying film loading in a camera for example

BACKGROUND OF THE INVENTION

To load most 35 mm cameras, a film cartridge is inserted in a loading chamber of the camera and the forward end portion of a film leader protruding from a light-trapping slit in a housing or shell of the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the housing and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

A problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

SUMMARY OF THE INVENTION

According to one aspect of the invention a film cartridge comprising a filmstrip having longitudinally successive perforations, and a housing for the filmstrip having a film passage slit through which the filmstrip can be moved into or out of the housing, is characterized by:

an indicator flag;

means supporting the indicator flag for reciprocating movement; and actuator means positioned for engagement and disengagement with each perforation of the filmstrip as the filmstrip is moved through the slit to move the indicator flag forward and backward alternately, whereby a visible motion-indication is provided that the filmstrip is moving through the slit.

According to another aspect of the invention a film motion indicator to be used with a filmstrip having longitudinally successive perforations, comprises:

a reciprocatingly movable indicator, including an integral actuator pawl engageable and disengageable with each perforation of the filmstrip as the filmstrip is moved to move the indicator forward and backward alternately for providing a visible motion-indication that the filmstrip is moving.

DETAILED DESCRIPTION OF THE INVENTION

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Figure 1:
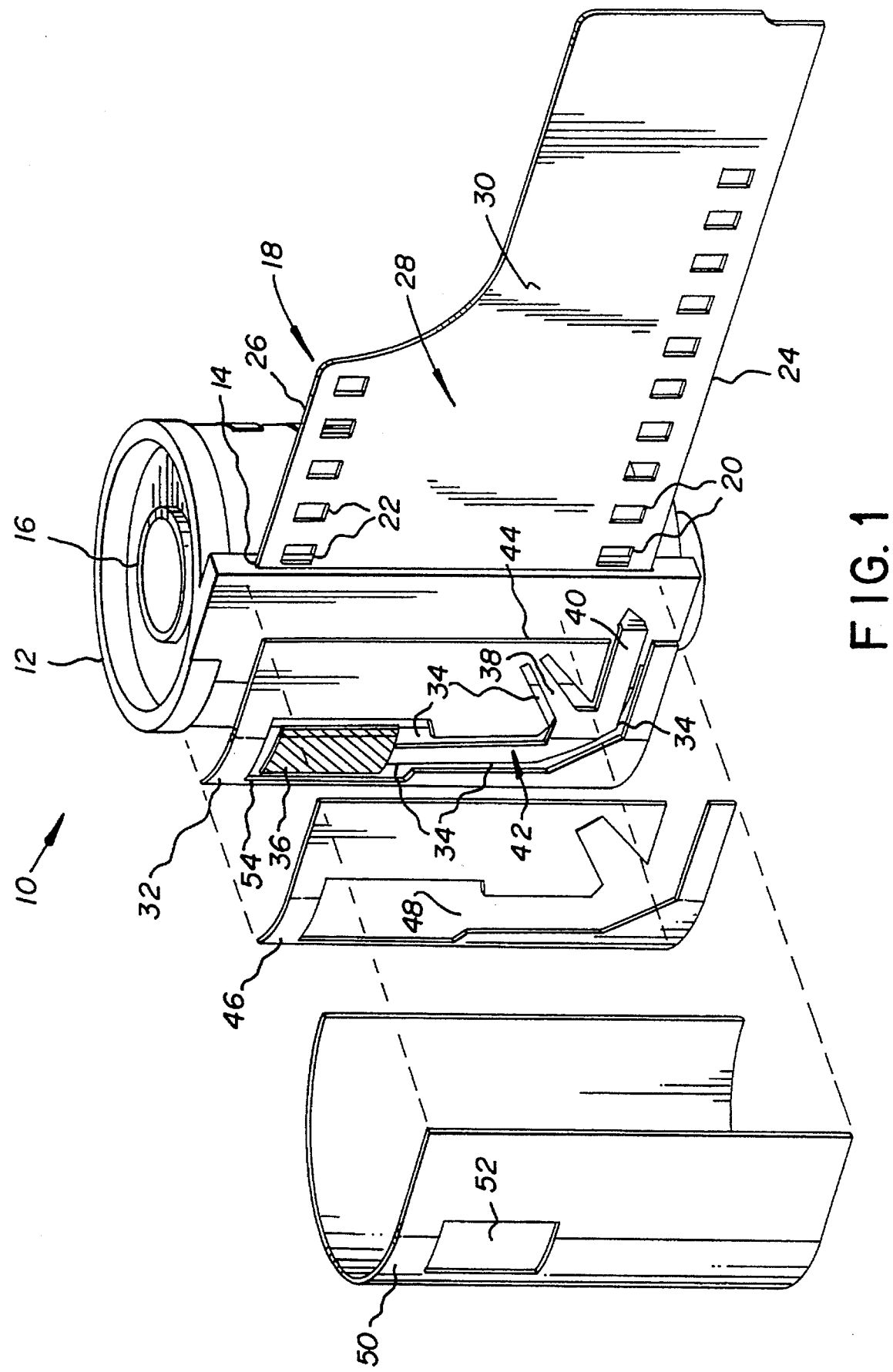
FIG. 1 is an exploded perspective view of a film cartridge with a visual indicator for verifying film loading in a camera according to a preferred embodiment of the invention.

Referring now to the drawings, FIG. 1 shows a film cartridge 10 comprising a housing 12 with a plush-lined light-trapping film passage slit 14 and a flanged film spool 16 rotatably supported inside the housing. A 35 mm filmstrip 18 having two identical series of longitudinally successive edge perforations 20 and 22 inwardly adjacent respective longitudinal film edges 24 and 26 is loosely coiled in a film roll about the film spool 16 between a pair of radial flanges, not shown, on the film spool. An inner end portion of the filmstrip is attached to the film spool 16. The first several frame lengths, i.e. 3-4 frame lengths, of the filmstrip 18 constitute a film leader 28. The film leader 28 forms an outermost convolution of the film roll and has a partly reduced-width forward or leading end portion 30 that initially protrudes from the film passage slit 14.

A rectangular, substantially flat, resilient sheet 32 is secured to the exterior of the housing 12 as shown in FIG. 1. The sheet 32 has a cut-out space 34 that defines an indicator flag 36, a support 38 and an actuator pawl 40 as an integral single-piece unit 42. The single-piece unit 42 is not secured to the exterior of the housing 12. The actuator pawl 40 extends from a peripheral edge 44 of the sheet 32 to be positioned for engagement and disengagement with each perforation 20 of the filmstrip 18 as the filmstrip is moved through the film passage slit 14 into or out of the housing 12.

When the actuator pawl 40 is engaged and disengaged with each perforation 20 of the filmstrip 18 as the filmstrip is moved through the film passage slit 14 out of the housing 12, the actuator pawl is first pulled forward (to the right in FIG. 1) in engagement with the filmstrip and is than snapped rearward (to the left in FIG. 1) out of engagement with the filmstrip because of the resilience of the support 38. This makes the indicator flag 36 vibrate from side to side to provide a visible motion-indication that the filmstrip 18 is moving through the film passage slit 14.

When the actuator pawl 40 is engaged and disengaged with each perforation 20 of the filmstrip 18 as the filmstrip is moved through the film passage slit 14 into the housing 12, the actuator pawl is first pushed rearward (to the left in FIG. 1) in engagement with the filmstrip and is than snapped forward (to the right in FIG. 1) out of engagement with the filmstrip because of the resilience of the support 38. This makes the indicator flag 36 vibrate from side to side to provide a visible motion-indication that the filmstrip 18 is moving through the film passage slit 14.

A rectangular, substantially flat, resilient spacer 46 is secured to the sheet 32 as shown in FIG. 1, to cover the sheet except for the single-piece unit 42. The single-piece unit 42 is exposed at a void 48 in the spacer 46 which is the same as or slightly larger than the cut-out space 34 in the sheet 32.

A label 50 is secured to the exterior of the housing 12 over the spacer 46, and to the spacer, as shown in FIG. 1. The label 50 has an opening or transparent window 52 in which the indicator flag 36 is to be seen, particularly when the indicator flag is vibrated from side to side.

Figure 2:
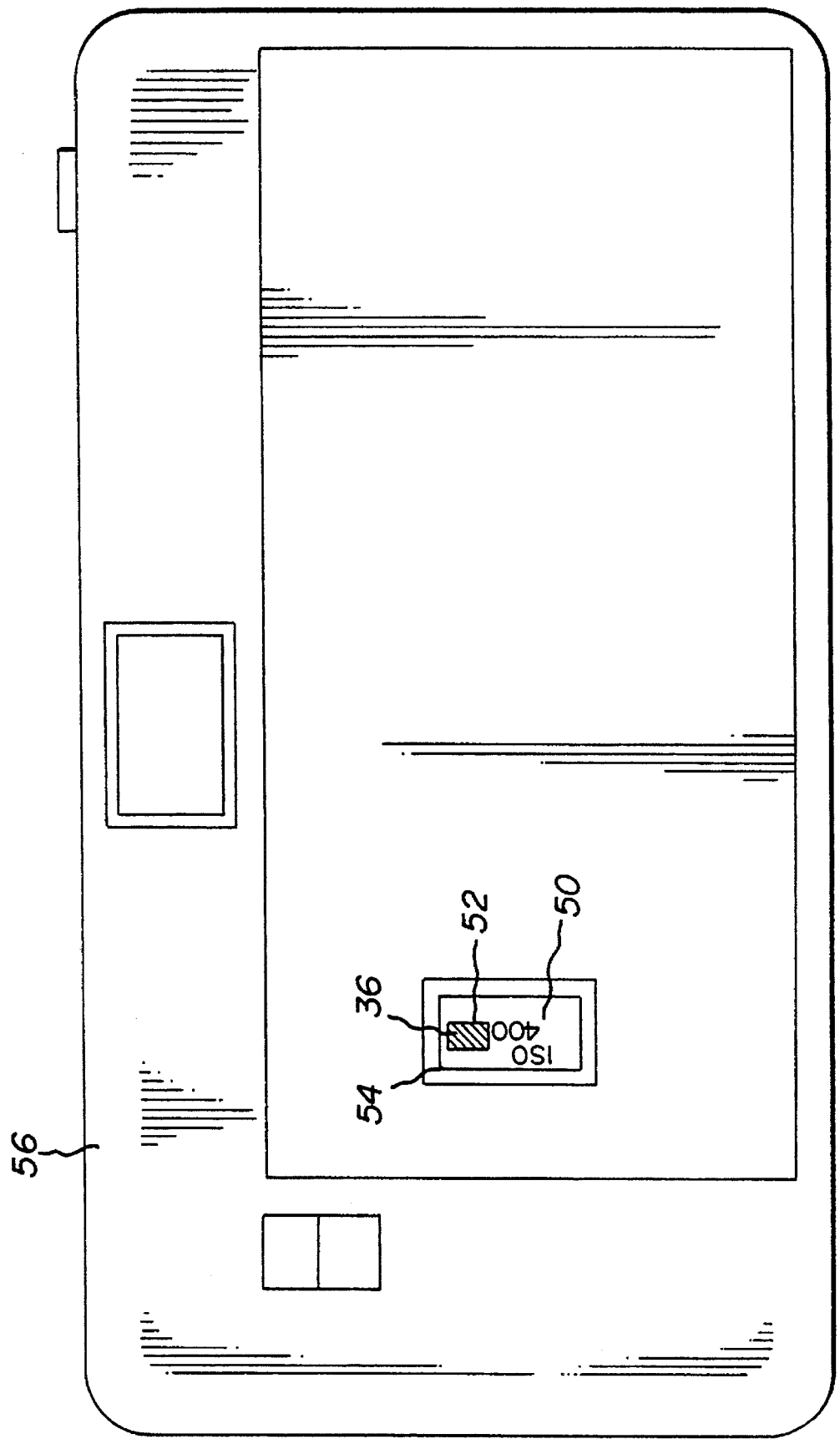
FIG. 2 is a rear elevation view of a camera containing the film cartridge.

The opening 52 and the indicator flag 36 are located on the housing 12 to permit the indicator flag to be seen through a rear window 54 of a camera 56 when the film cartridge 10 is in the camera. See FIG. 2.

The invention has been described with reference to a preferred embodiment. However, it will be appreciated that variations and modifications can be effected by a person of ordinary skill in the art without departing from the scope of the invention. For example, the sheet 32 and the spacer 46 could be connected at a common fold-line. Also, the opening 52 in the label 50 may contain a unitary lenticular array or the equivalent and the indicator flag 36 may have a plurality of parallel lines. In this case, the indicator flag would be moved in a direction that creates a Moire effect (which visually amplifies the apparent motion).

PARTS LIST 10. film cartridge
12. housing
14. film passage slit
16. film spool
18. filmstrip
20. film perforations
22. film perforations
24. longitudinal film edge
26. longitudinal film edge
28. film leader
30. leader leading end portion
32. sheet
34. cut-out space
36. indicator flag
38. support
40. actuator pawl
42. single-piece unit
44. peripheral edge
46. spacer
48. void
50. label
52. opening
54. rear window
56. camera

We claim:

1. A film cartridge comprising a filmstrip having longitudinally successive perforations, and a housing for said filmstrip having a film passage slit through which the filmstrip can be moved into or out of said housing, is characterized by:

an indicator flag;

means supporting said indicator flag for reciprocating movement; and actuator means positioned for engagement and disengagement with each perforation of said filmstrip as the filmstrip is moved through said slit to move said indicator flag forward and backward alternately, whereby a visible motion-indication is provided that the filmstrip is moving through the slit.

2. A film cartridge as recited in claim 1, wherein said indicator flag, said supporting means and said actuator means are an integral single-piece unit.

3. A film cartridge as recited in claim 2, wherein said single-piece unit is secured to said housing only at said supporting means.

4. A film cartridge as recited in claim 3, wherein said supporting means is resilient to permit said indicator flag to be moved forward and backward.

5. A film cartridge as recited in claim 1, wherein a substantially flat sheet is secured to the exterior of said housing and has a cut-out space that defines said indicator flag, said supporting means and said actuator means as an integral single-piece unit.

6. A film cartridge as recited in claim 5, wherein said actuator means includes an actuator pawl that extends from a peripheral edge of said sheet to be positioned for engagement and disengagement with each perforation of said filmstrip as the filmstrip is moved through said slit.

7. A film cartridge comprising a filmstrip having longitudinally successive perforations, and a housing for said filmstrip having a film passage slit through which the filmstrip can be moved into or out of said housing, is characterized by:

a reciprocatingly movable indicator, including an actuator pawl positioned for engagement and disengagement with each perforation of said filmstrip as the filmstrip is moved through said slit to move said indicator forward and backward alternately for providing a visible motion-indication that the filmstrip is moving through the slit.

8. A film motion indicator to be used with a filmstrip having longitudinally successive perforations, comprises:

a reciprocatingly movable indicator, including an integral actuator pawl engageable and disengageable with each perforation of the filmstrip as the filmstrip is moved to move said indicator forward and backward alternately for providing a visible motion-indication that the filmstrip is moving.

9. A film motion indicator as recited in claim 8, wherein a sheet has a cut-out space that defines said reciprocatingly movable indicator.

10. A film motion indicator as recited in claim 9, wherein a spacer adapted to cover said sheet has a void which is at least as large as said cut-out space in the sheet.

* * * * *